March 3, 1964 J. D. SILVA 3,123,668

VIDEO TAPE EDITING SYSTEM

Filed Dec. 6, 1960 4 Sheets-Sheet 1

INVENTOR
JOHN D. SILVA
BY Lyon & Lyon
ATTORNEYS

March 3, 1964 J. D. SILVA 3,123,668

VIDEO TAPE EDITING SYSTEM

Filed Dec. 6, 1960 4 Sheets-Sheet 2

INVENTOR.
JOHN D. SILVA

BY Lyon & Lyon

ATTORNEYS.

March 3, 1964 J. D. SILVA 3,123,668

VIDEO TAPE EDITING SYSTEM

Filed Dec. 6, 1960 4 Sheets-Sheet 3

INVENTOR.
JOHN D. SILVA
BY
Lyon & Lyon
ATTORNEYS.

March 3, 1964 J. D. SILVA 3,123,668

VIDEO TAPE EDITING SYSTEM

Filed Dec. 6, 1960 4 Sheets-Sheet 4

INVENTOR.
JOHN D. SILVA
BY Lyon & Lyon
ATTORNEYS.

3,123,668

VIDEO TAPE EDITING SYSTEM

John D. Silva, Alhambra, Calif., assignor to Paramount Television Productions, Inc., Hollywood, Calif., a corporation of California Filed Dec. 6, 1960, Ser. No. 74,164
10 Claims. (Cl. 178—6.8)

This invention is for a system for editing magnetic tape of the type known as Videotape and employed for recording video signals.

This application is a continuation-in-part of an application for Video Tape Editing System, Serial No. 855,916, filed November 27, 1959, now abandoned.

The television broadcasting industry has eagerly purchased apparatus for recording video signals on magnetic tape and for reproducing these recorded video signals. Videotape machines of this type are manufactured and sold, for example, by the Ampex Corporation of Redwood City, California. In the use of these systems for broadcast television, it oftentimes is necessary to edit the Videotape. This is done usually for the same reason as exists in the movie industry, namely, for cutting out undesired scenes, or for inserting others, or for inserting advertising material. Thus, it becomes necessary to select the position on the tape at which the splicing or cutting is desired. These functions are usually referred to as the editing and splicing of Videotape.

The problem of cutting Videotape for subsequent joining with another piece of tape, so that tracking and vertical sync problems are avoided, has been solved. The present practice is to render visible the magnetic recording signals in the region in which the splice is to occur by applying an aqueous solution of fine graphite. Then, a high-powered microscope is employed to find the exact location between the passes of the video information recorded on the tape at which a cut can be made.

Although the splicing problem has been overcome, a problem still present is the one of the selection of the exact splicing point on Videotape, determined by the producer and editor, after having observed the recorded pictures on a viewing monitor. Unlike motion-picture film, where the editor can select an exact picture frame by using a Moviola, the Videotape editor has only an electronic signal that can be viewed only when a video head is scanning at a rate of 14,400 r.p.m. normal to the axis of the tape, and while the tape itself is being moved laterally past the scanning station at 15 inches per second.

Accordingly, an object of this invention is the provision of a system for editing Videotape.

Another object of this invention is the provision of a system for enabling the viewing of Videotape and marking the exact spot at which it is desired to make a splice while the tape is moving.

Yet another object of the present invention is the provision of a novel and useful Videotape editing apparatus.

These and other objects of the present invention may be achieved wherein in one arrangement four storage tubes are employed having kinescope-type presentations. These storage tubes allow any given television frame to be "frozen" at any determined interval of time as the Videotape passes the playback head. Means are provided for marking a point on the Videotape, after which viewing for the purpose of editing is desired. Circuit means thereafter cause the storage tubes to display four pictures read at four spaced intervals from the Videotape. The editor can then determine between which two of the four pictures displayed he wishes a further investigation for splicing purposes to be made. With this invention, upon a rerun of the tape, the storage tubes will display four pictures which occur at equal intervals within the selected interval period. This process of viewing the picture within a smaller and smaller interval can progress until the editor sees a picture at which he desires the cut or splice to occur. Alternative to storage tubes, a camera may be used for taking pictures to be used for editing. Circuit means are provided for marking the Videotape with a signal which can thereafter be rendered either, or both, audible and visible for enabling tape to be cut at the edit pulse nearest the exact point selected by the editor for splicing.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
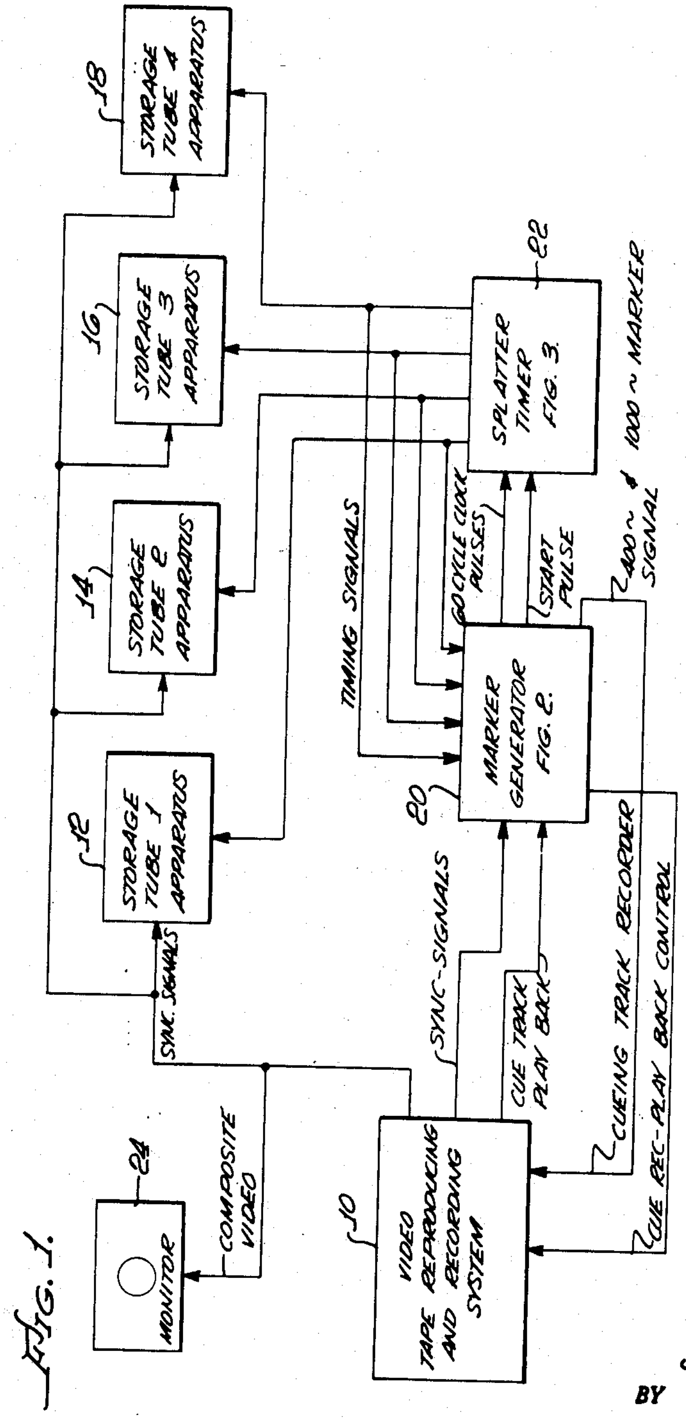
FIGURE 1 is a block diagram of an embodiment of the invention.

Reference is now made to FIGURE 1, which shows a block diagram of the embodiment of the invention. In FIGURE 1 there is represented by a rectangle 10 a Videotape machine. By this designation it is intended to indicate by way of example apparatus manufactured and sold by the Ampex Corporation of Redwood City, California, and called the Ampex VR–1000. This Videotape apparatus records signals on four separate, but synchronized, magnetic tracks. The first track comprises a series of transverse video tracks. The second track comprises a sound track which accompanies the picture. This sound track is impressed at one side of the tape, designated as the top of the tape. A third track is the control track. This comprises the record of the alternating current employed to drive a motor which rotates four recording heads over the tape during recording. A fourth track is provided which is known as the cueing track. Composite video signals are recorded transversely on the tape while the other signals are recorded longitudinally on the tape. The cueing track has recorded thereon edit pulses for establishing locations for cutting the tape between the transversely recorded video signals. Thus, the transversely recorded video signals comprise a series of recorded lines or tracks which are parallel to one another. Each track carries 16 or 17 horizontal lines of television information. On playback of a Video-recorded tape, the Videotape machine 10 will provide as output composite video signals, synchronizing signals, as well as the signals which are recorded on the control track and the cueing track. For the purposes of this invention, concern is had with the composite video-signal output, the synchronizing-signal output, and output from the cueing track.

There is also represented by rectangles, respectively 12, 14, 16, and 18, storage-tube apparatus. This storage-tube apparatus is exemplified by that sold by the Hughes Products Industrials Systems Division of the Hughes Aircraft Company, which is located in Los Angeles, California. This apparatus is designated as a storage monitor, Model 201, and is capable of "freezing" the action of any television frame. The apparatus includes a storage-display tube, known as the Tonotron, which, when a store button is actuated or a store-command signal is received from a remote-control unit, can "freeze" a television image applied to the tube and can hold it until another switch is pressed, whereupon an erasure occurs, and the tube is ready to store the next image.

Figure 2:
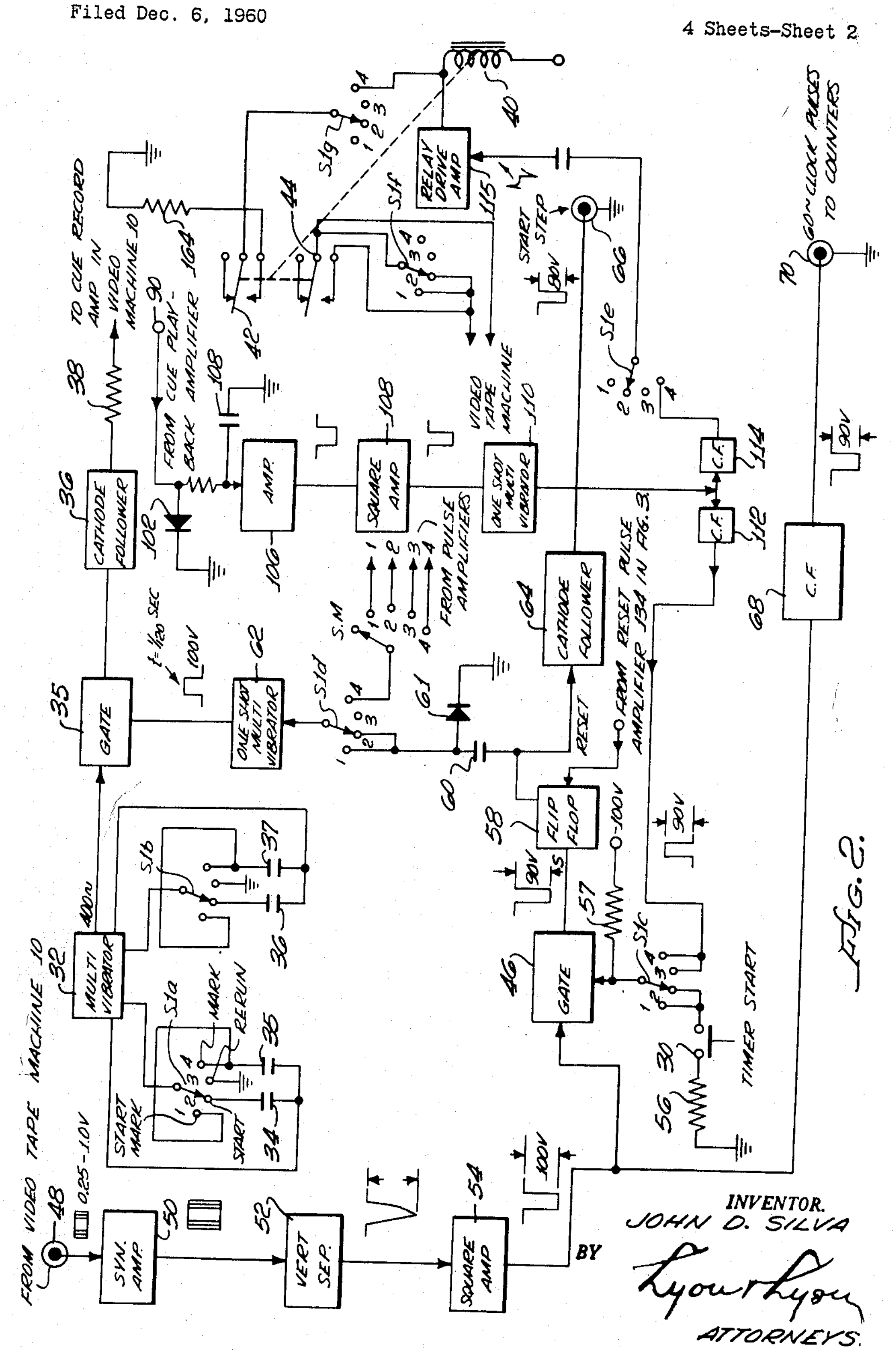
FIGURE 2 is a block diagram of a marker generator which is employed in the embodiment of the invention.
Figure 3:
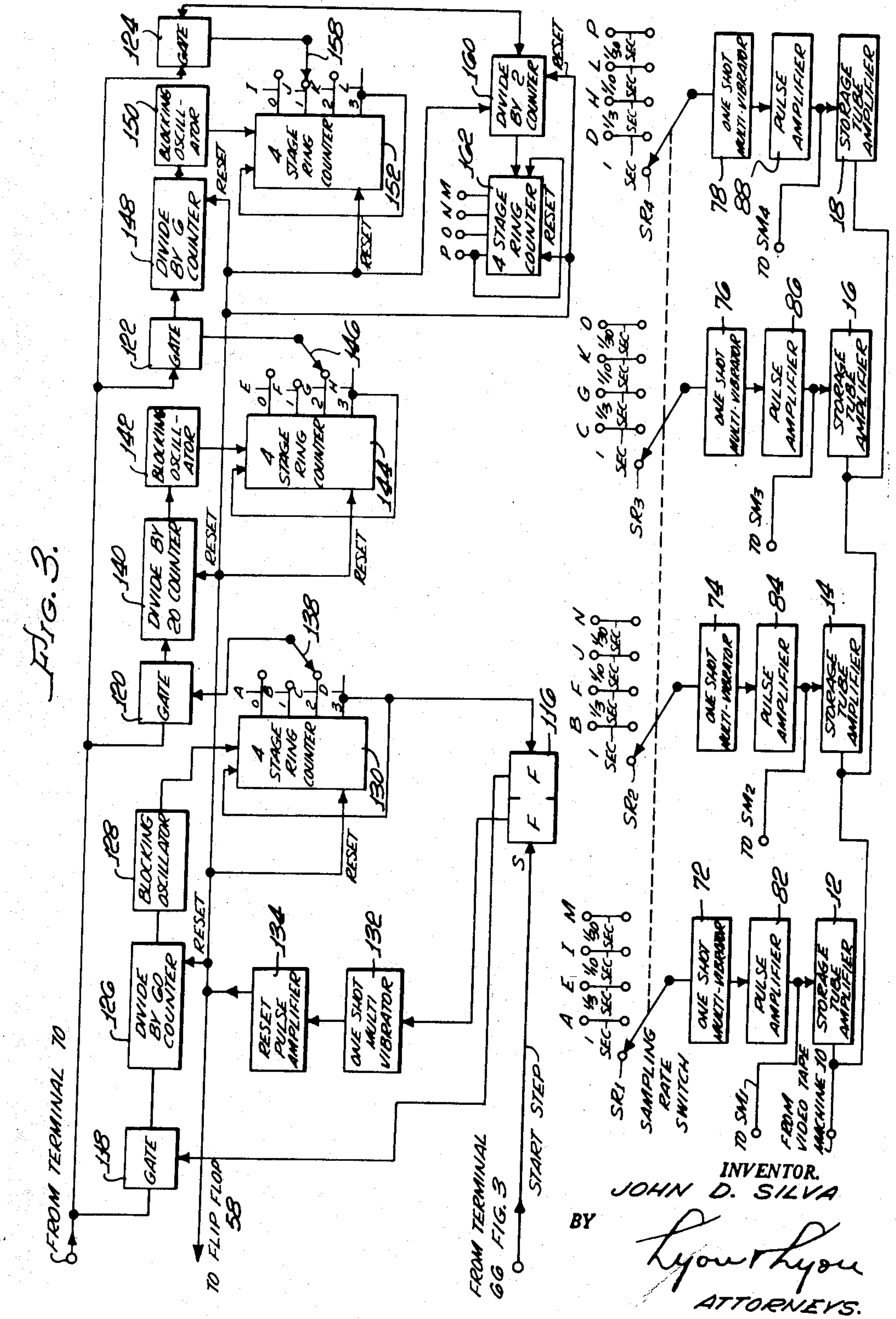
FIGURE 3 is a block diagram of the timer circuit which is employed in the embodiment of the invention.

The invention also employs circuitry, respectively designated as the marker generator 20, which is shown in more detail in FIGURE 2, and a timer generator 22, which is shown in more detail in FIGURE 3. When it is desired to use the invention for editing, then switch means are provided in the marker generator for placing a signal on the cue track of the Videotape being played through the Videotape recorder and reproducer 10, which indicates the point after which it is desired to view the tape for editing. Such selection can be made using the usual type of video monitor 24, to which composite video signals being provided by the Videotape machine 10 are applied. Thereafter, over a predetermined interval of viewing time, such as, for example, three seconds, the timer 22 will enable each one of the storage-tube apparatus 12, 14, 16, 18 to display television pictures occurring at the beginning of the first, second, third, and fourth seconds, respectively.

The editor then determines between which two of the four displayed pictures, or within which portion of the interval therebetween, he wishes to investigate the appearance of the recorded pictures. The pictures on the storage tubes are then erased by the actuation of the switches provided for the purpose thereon. Switch means are provided within the timer generator for selecting within which portion of the initially displayed interval it is now desired to examine the recorded pictures. Thereafter, the Videotape is rerun, and the timer provides signals at equally spaced intervals within the designated interval, which signals are applied to the storage-tube apparatus for displaying four pictures occurring at equally spaced intervals within the interval within which inspection is desired. These may be on the order of one-third of a second apiece, within the one-second interval selected.

The succession of examination of smaller and smaller intervals recorded on the tape can proceed until four frames recorded adjacent one another are displayed. However, if at any time the editor sees a picture at which he desires the splice to occur, a means is provided in the marker generator for indicating this. Thereafter, upon the tape being rerun, a marker signal different from the previously indicated marker signal is recorded on the tape at the exact spot selected by the editor for cutting. The timer feeds timing signals back to the marker generator wherein there is provided the means for selecting a timing signal from the timer which occurs at the time when the selected picture video signals pass under the read heads. The selected timing signal enables the marking signal to be recorded on the cue track at a location associated with that of the selected video signals. Subsequently, the tape is "developed" so that the edit pulse nearest this marking signal is rendered visible, and suitable means for cutting at that spot can be employed. It should be noted that the video recording and reproducing heads are at a location approximately nine and one-half inches behind the cueing-track recording and reproducing head, in the direction of tape motion. Thus the exact cutting location is found by either measuring the displacement distance on the tape or by manually pulling the tape in the region of the marking signal until the 1000-cycle marking signal is heard. This occurs when the marking signal is under the cueing track head. An ink mark can then be placed on the tape at the location of the edit mark which is under the video heads at that time.

Reference is now made to FIGURE 2, which is a detailed block diagram of the circuitry required in the marker generator. As previously indicated, an editor will have reviewed the pictures recorded on the monitor 24 and will have determined at which location along the Videotape he wishes to make a more detailed inspection for the purpose of establishing a splice. The tape is then rerun to a location before the selected area. In the marker generator, there is shown a multideck selector switch wherein the various decks are designated as S1*a*, S1*b*, S1*c*, S1*d*, S1*e*, S1*f*, and S1*g*. These decks are all ganged together. For clarity in the drawing, the respective decks are positioned at locations adjacent the apparatus to which they are wired. It will be understood, however, that in view of the ganging of the selectors, a contact in the same relative position is selected on every one of these decks simultaneously. In the beginning the selector switch is operated to select the second contact position which is on the S1*a*, deck, and the S1*b* deck is designated as the start position. The Videotape is then run forward by the Videotape machine, and the editor views the picture on the standard television monitor 24. When he sees a picture on the monitor which indicates the beginning of the region in which he wishes to make an inspection, he pushes a timer-start switch 30 on the marker generator. This results in the placing of a mark on the cue track of the Videotape which comprises a 400-cycle signal.

The 400-cycle signal is generated by a multivibrator 32 in the marker generator. The placing of the selector switch S1 on the start position has the effect of connecting timing capacitors 34, 36 to the multivibrator, which can then operate at the 400-cycle frequency. Selectors S1*a* and S1*b*, which are connected to the multivibrator 32, are positioned to be connected to the number 2 contacts. These contacts are connected through capacitors 34 and 36 into the frequency-determining section of the multivibrator 32. The output of the multivibrator 32 is applied to a normally closed gate 35. This gate is inoperative and is not opened until it receives a signal which is initiated by the operation of the momentary switch 30. The output of the gate 34, when it is opened, is applied through a suitable coupling circuit, here represented by a cathode follower 36 and resistor 38, to the cueing-track record amplifier (not shown) which is within the Videotape machine 10.

The Videotape machine 10 has both the requisite record and read apparatus in association with the cueing track on the Videotape. However, it is necessary to provide connections to switch between the read and write circuits when either a read- or a record-mode type of operation is desired. This function is provided for by a relay 40 in the marker generator. This relay has two pairs of single-pole, double-throw contacts 42, 44. When the relay is inoperative, as it is at the outset, the S1*f* selector of switch S1 is connected to the movable swinger of the single-pole, double-throw contacts 44 of the relay 40, and contacts 1 and 2 associated with selector S1*f* are connected to the cueing-control circuits in the Videotape machine 10. A connection is also made from the swinger of the single-pole, double-throw contacts 44 to the cueing-track-control apparatus in the Videotape machine. As a result, a circuit is provided which operates the cueing-track-control apparatus to be in its recording mode. When the circuit connection, which is made from the cueing-track-control apparatus (not shown) in the Videotape machine 10 to the movable swinger of the single-pole, double-throw relay contacts 44, then through the selector S1*f* to associated contact 1 thereon back to the Videotape machine, is open then the cueing-control apparatus is in its reading mode. When a circuit is made as illustrated, then the cueing-control apparatus is set in its writing mode. Thus, with the selector switch S1 operated to make contact with the number 2 contacts on all the decks, the Videotape cueing-control apparatus is set to record on the cueing track any signal provided by the cathode follower 36.

It was stated that when the momentary switch 30 was operating it enabled gate 34 to be opened, whereby a 400-cycle signal could be recorded on the cueing track. More specifically what occurs is that the momentary switch 30 enables a gate 46 to be opened. This gate receives pulses at the frequency of the vertical-synchronization signals. The Videotape machine 10 delivers as one of its outputs synchronization signals. These are applied to a terminal 48 of the marker generator. These signals are amplified by a synchronization-signal amplifier 50 and are then applied to a vertical-sync separator circuit 52. This circuit is of the type usually found in any television receiver, wherein it is desired to separate the broad vertical-sync pulses from the narrow horizontal-sync pulses.

The output of the vertical-sync separator 52 is applied to a squaring amplifier 54 which, as represented by the wave shapes shown adjacent the outputs, renders more rectangular the vertical-sync signal applied to its input. The output of the squaring amplifier 54 is then applied to the gate 46. This gate, which is normally closed, has its enabling input connected to the selector arm S1*c*. The contact number 2 on this deck is connected through the momentary switch 30 and a resistor 56 to ground. A resistor 57 is connected between the selector arm 1C and a source of negative potential. Therefore, until switch 30 is actuated, the gate is biased off by a negative potential. When the momentary switch 30 is operated, it enables current to flow through resistors 56, 57; this raises the potential applied to gate 46. The gate is opened and it passes the pulses which it receives while it is open. The first of these pulses which passes through the gate 46 operates to set a flip-flop circuit 58. This flip-flop circuit is reset by a signal which is received from the timer-circuit reset generator, as will be explained in more detail later herein.

The set output of the flip-flop 58 is differentiated by a network including a capacitor 60 and rectifier 61, and is then applied to a one-shot multivibrator 62. More specifically, the flip-flop output is connected to a capacitor 60, which in turn is connected to the first and second contacts associated with selector arm S1*d*. The selector arm S1*d* is connected to the input of a one-shot multivibrator 62. In response to the flip-flop output, the one-shot multivibrator provides a pulse having a time duration on the order of $1/120$ of a second. This output pulse is applied to gate 34, to open it for the duration of the $1/120$ of a second to pass the 400-cycle signal which is recorded on the cue track of the Videotape.

A portion of the output from flip-flop 58, which is not differentiated, is applied through a cathode-follower circuit 64 to an output terminal 66, which is connected to the timer. The signal received by the timer initiates its timing operations. The output of the squaring amplifier 54, besides being applied to the gate 56, is also applied through a cathode-follower circuit 68 to an output terminal 70 connected to the timer circuit. It should be recalled that the output of the squaring amplifier 54 comprises rectangular pulses which occur at a 60-cycle-per-second or vertical-sync frequency rate.

After the Videotape has been marked by a 400-cycle signal as described, the Videotape is then backed past the 400-cycle signal, and the Videotape apparatus is placed in condition for the commencement of a rerun. This time it is necessary to set a sampling-rate switch, which is shown on FIGURE 3, to the position which identifies the intervals over which the video picture will be displayed on the storage-tube apparatus. The sampling rate switch, designated as "SR," has four selector arms SR1, SR2, SR3, and SR4. These are ganged together. This switch may be of the same type as shown in FIGURE 2, namely, a multideck switch. The switch has five contacts on each deck, the first of which is an off-contact. Selection of each one of the other contacts successively enables pictures to be displayed on the storage tubes, which occur at one-second intervals, one-third second intervals, within any selected one second; one-tenth second intervals, within any selected one-third second; and one-thirtieth second intervals, within any selected one-tenth second. Each one of the contacts on each one of the decks connects to a different counter in the timer. The arrangement for these connections will become more clear as this explanation progresses.

In the beginning, the sampling-rate switch is operated to the one-second selection position. The selector arm on each deck of the sampling-rate switch is connected to a separate one-shot multivibrator 72, 74, 76, 78. The output of each of the one-shot multivibrators is respectively applied to a separate pulse amplifier 82, 84, 86, 88. The output of each of the pulse amplifiers is applied to the respective storage-tube apparatus 12, 14, 16 and 18. The respective one-shot multivibrators and pulse amplifiers operate in response to successive timing signals to provide a pulse to each storage-tube apparatus, which turns on and enables it to store a single video-picture frame which is being read from the Videotape at the time the timing signal is received.

Before the rerun, for the purpose of inspecting a region of Videotape is commenced, it is also necessary to operate the switch S1 on the marker generator to its third or rerun contact. Thereby, the multivibrator 32 is no longer permitted to oscillate. Also, the input to the one-shot multivibrator 62 is removed. Thus no accidental marking of the cue track will occur.

The Videotape recording and reproducing apparatus 10 can now be operated to rerun the magnetic tape. It should be noted that with the switch S1 in FIGURE 2 operated to make contact with the third contact, selector arm S1*f* is operated to a position at which the circuit to the Videotape machine is opened, whereby the cue-control apparatus is placed in its read mode. Thus, when the 400-cycle signal on the cueing track is read, it is applied to terminal 90 in the marker generator. The signal thereafter is converted to a negative-going pulse by the circuit including a rectifier 102 connected between terminal 90 and ground, a resistor 104 connecting terminal 90 to the amplifier 106, and a capacitor 108 connecting the input of the amplifier 106 to ground. Thus, the rectifier 102, resistor 104, and capacitor 108 operate as a detecting-and-filtering network to convert the received 400-cycle sine wave to a rectangular pulse. This pulse is amplified by the amplifier 106

It should be recalled that the 400-cycle sine-wave signal which was recorded on the cueing track had a duration of $1/120$ of a second. Thus, the pulse applied by the amplifier 106 to a squaring amplifier 108 will also have a duration of $1/120$ of a second. The output of the squaring amplifier 108 is applied to a one-shot multivibrator 110. The time constants of this multivibrator are adjusted to provide output pulses, each having a duration on the order of one-tenth of a second.

The output of the one-shot multivibrator 110 is applied to two cathode followers 112 and 114. The output of cathode follower 112 is applied to the contact 3 associated with selector arm S1*c* of the selector switch S1. Thus, the gate 46 is enabled and it will pass a vertical-sync pulse which will set flip-flop 58. The output of flip-flop 58 is applied through the cathode follower 64 to terminal 66. Terminal 66 is connected in the timer circuit shown in FIGURE 3 to a flip-flop 116. This flip-flop is set in response to the received signal, and thereby operates to open a gate 118. As was previously described, the terminal 70 has applied thereto pulses at the vertical-sync frequency rate, which is 60 pulses per second. These are applied to the gate 118 as well as to other gates 120, 122, 124. However, since at this time only gate 118 is opened, only gate 118 will pass pulses to be counted by a following counter 126. This counter has a 60-count capacity. This counter, when reset, is placed in its fifty-ninth, or next-to-last, count condition. Thus, the first pulse which is received from the gate 118 causes counter 126 to provide the sixtieth-count output. This sixtieth-count output is applied to a blocking oscillator 128. The blocking oscillator applies an output pulse to a four-stage ring counter 130.

It should be noted at this time that the divide-by-60 counter provides an output to the four-stage ring counter which occurs once every second. The four-stage ring counter is preferably of the binary-counter type, wherein each binary stage can provide an output which lasts as long as that stage is set. Thus, the four-stage ring counter provides four outputs in sequence, each one of which is one second in duration and each one of which starts immediately upon the termination of the preceding output.

The outputs of the four-stage ring counter 130 are respectively designated as 0, 1, 2, and 3. The four-stage ring counter 130 is reset to its last count condition. The first output from the blocking oscillator 128 causes the four-stage ring counter to provide the zero output, which has a duration of one second. One second later, the one output of the four-stage ring counter is excited. The next second later, the two output of the four-stage ring counter is excited. One second later the three output of the four-stage counter is excited. Thus, the counter outputs exist over intervals which can be designated as from zero to one second, from one to two seconds, from two to three seconds. The counter outputs are connected to terminals, respectively designated as A, B, C, D, which connect to the contacts on decks SR1, SR2, SR3, SR4, designated by the letters A, B, C, D.

With the selector switch SR1 on contact A, the one-shot multivibrator 72 will receive an input signal which is amplified by the pulse amplifier 82 and applied to the storage-tube apparatus have a duration of one-thirtieth of a second. 72, 74, 76, 78 have their time constants established so that the signals which are applied to the respective storage-tube apparatus have a duration of one-thirtieth of a second, Each storage-tube apparatus will thus be enabled to freeze a video frame recorded on the tape at the time it receives a signal.

On the second deck of the SR selector switch, the selector SR2 will receive an output over the contact connected to the B terminal of the four-stage ring counter. Thereby, the one-shot multivibrator 74 generates a pulse having a one-thirtieth of a second duration. This is applied to the pulse amplifier 84, which enables the storage apparatus 14 to store and reproduce a frame of video signals recorded at the commencement of the first second on the Videotape. Similarly, selector arms SR3 and SR4 receive from the respective contacts C and D outputs from the four-stage ring counter 130 which are applied to the respective one-shot multivibrators 76 and 78 and thence through the respective pulse amplifiers 86 and 88 to the storage-tube apparati 16 and 18. Thereby, these storage apparati are enabled to freeze the frames of video signals occurring at the commencement of the second and third seconds on the Videotape.

The fourth output of the four-stage ring counter 130 is applied to the flip-flop 116, whereby this flip-flop is reset. This opens gate 118 in response to which no more pulses to be counted are applied to the divide-by-60 counter 126. When reset the output of the flip-flop 116 is applied to a one-shot multivibrator 132. This one-shot multivibrator generates an output pulse which is amplified by a reset-pulse amplifier 134. The reset-pulse amplifier applies its output to a line, which resets counter 126 to the 59-count condition. Also, the output of the reset-pulse amplifier is applied to the flip-flop 58 in FIGURE 2, to reset it. This reset-pulse amplifier output is also applied to all the four-stage ring counters 130, 144, 152, and 162, to reset them to their first count condition. It will be recalled that, for the purpose of providing a mark using the 400-cycle signal, the flip-flop 58 was set. The divide-by-60 counter 126, as well as the four-stage ring counter 130, at that time were also enabled to operate, whereby a reset pulse was applied to flip-flop 58 three seconds after it was initially set, thus placing it in its reset condition in ample time before the subsequent marking operation.

If the editor, upon viewing the four pictures which are displayed, finds one of these at which the tape should be cut, then by operating the S1 switch on the marker generator to the fourth contact position and by operating a selector switch SM on the marker generator from its off-contact to one of the four other contacts, each of which is connected to the output of the respective pulse amplifiers 82, 84, 86, and 88, the invention can be placed in condition to mark the Videotape at the position of a picture selected for cutting. Assume, however, at this time that the editor wishes to inspect the interval between the second and third second after the 400-cycle mark for editing possibilities. In FIGURE 3, the first three outputs from the four-stage ring counter 130, besides being connected to the contacts designated as A, B, and C on the sampling rate switch, are also connected to the contacts of a selector switch 138. Selector switch 138 is turned to select the third output of the four-stage ring counter, which occurs upon the commencement of the second second after the 400-cycle mark on the Videotape and lasts for the interval from the second to the third second. On the marker generator, the S1 switch is left in the rerun position and the SM switch is left in the mark-off position. On the timer, however, the sampling rate switch SR is turned to the contact marked one-third-of-a-second. This is the one next to the contact marked one-second.

The Videotape in the Videotape machine is then backed up to a position just before the 400-cycle mark. It is then started forward again. When the 400-cycle signal is read on the cueing track, it is detected by the circuit in the marker generator and employed to drive the one-shot multivibrator 110, the output of which again opens gate 46. Thereby, the flip-flop 58 is driven to its set state, and the output pulse is applied to drive flip-flop 116 to its set state and to open gate 118. As a result, the pulses at the vertical-synchronization frequency are applied to the counter 126. The output of this counter is applied to the blocking oscillator 128, which drives the four-stage ring counter 130. When the four-stage ring counter 130 obtains its third count condition, signifying the commencement of the second second after the mark on the Videotape, the output is applied to gate 120 to open it for the duration of the second second. Pulses at the vertical-sync signal rate are enabled to pass through gate 120 and are applied to a divide-by-20 counter 140. When reset this counter is left in its nineteenth count condition. Therefore, the first pulse received from the gate 120 drives it to its twentieth count condition, whereby an output is applied to a blocking oscillator 142.

This blocking oscillator applies its output to a four-stage ring counter 144, which is of substantially identical construction to the four-stage ring counter 130 outputs of which are respectively designated as 0, 1, 2, and 3, are connected to the contacts on the sampling-rate switch, respectively designated as E, F, G, H. These outputs occur at each successive one-third-of-a-second interval after the commencement of the second which has been selected by the selector switch 128.

In the manner previously described, the storage apparati 12, 14, 16, 18 will respectively display a picture frame which occurs at the commencement of the second second selected by the selector switch 138 and the successive one-third of a second thereafter. It will be appreciated that the "freeze" signals are derived from the outputs of the four-stage ring counter 144. This four-stage ring counter is reset in its last count condition so that the first pulse out of the blocking oscillator 142 will cause the first count output, designated as zero in the four-stage ring counter, to become enabled.

When the four-stage ring counter 130 has counted to its fourth count, which occurs at the end of the second second or the commencement of the third second, flip-flop 116 is reset, whereby the reset pulse is generated and counter 126 is reset to its fifty-ninth count, and counter 140 is reset to its nineteenth count. It should be noted, however, that the counter 140 is only enabled to count over the one-second interval selected by the switch 138, since the gate 120 is enabled only while counter 130 is providing an output to the selected output terminal.

If the editor is satisfied with one of the pictures displayed by the storage tubes, at this time he can select for marking any one of these by actuating the selector switch SM to the one of the four contacts connected to the one of the four storage tubes displaying the desired picture. Assuming, however, that this has not yet occurred, but some further inspection is required, e.g., between the second and third one-third-of-a-second after the second second, then the editor, without disturbing the previously indicated settings of the switches, adjusts a selector switch 146 to select the third count output of the four-stage ring counter 144. It should be noted that the first three outputs of the ring counter 144 are connected to a contact to which the selector arm of the selector switch 146 can be moved.

The sampling rate switch SR is switched to the third, or one-tenth-of-a-second, contact position. The Videotape machine then is instructed to back the tape to a position beyond the 400-cycle mark on the cueing track and then start it forward again. As described previously, the 400-cycle signal, when detected, enables the gate 118 to be opened. Thereafter the counters 126 and 130 operate to measure the two-second interval after the 400-cycle signal has been recognized, at which time counters 140 and 144 are enabled to measure one-third second intervals occurring after the second interval. Thus, after the elapse of two-and-two-thirds seconds from the 400-cycle mark, gate 122 is opened and a divide-by-6 counter 148 is enabled to receive the 60-cycle clock pulses.

The divide-by-6 counter 148 had been previously reset to its fifth count state. Therefore, in response to the first pulse received, it applies an output to the blocking oscillator 150. The output of this blocking oscillator is applied to another four-stage counter 152, similar in construction to counters 130 and 144. The divide-by-6 counter provides an output every one-tenth of a second. Therefore, the four outputs of the counter 152 will occur at the commencement of the interval being measured and successively at each one-tenth of a second thereafter. The four outputs of the counter 152, which are identified by the letters I, J, K, L, are respectively connected to the sampling-rate switch, which has contacts similarly identified. Therefore, at the end of two-and-two-thirds seconds, storage-tube apparatus 12 will display a television picture; one-tenth second later, storage-tube apparatus 14 will display a television picture; two-tenths of a second later, storage-tube apparatus 16 will freeze a picture; and three-tenths of a second later, storage-tube apparatus 18 will "freeze" a picture.

The counter 148 will receive pulses for counting only during one-third of a second. Counters 148 and 152 serve to provide picture-freezing signals during the one-tenths of a second occurring within that one-third of a second. At the end of the third second, all the counters 126, 130, 140, 144, 148, and 152 are reset, as well as the flip-flop 58.

If a decision can be made by the editor at this time, then as previously indicated, the marker-generator switches can be set to place a mark on the Videotape. Otherwise, the editor, by operating a selector switch 158 and moving the sampling-rate switch to the one-thirtieth second position, can view the video-signal fields which are recorded at one-thirtieth-of-a-second intervals occurring within any one-tenth second intervals delineated by the output of the counter 152. The selector switch 158 selects any one of the one-tenth-second intervals within which it is desired to view.

Assume that the selector switch is adjusted to the second one-tenth-of-a-second contact position. The Videotape apparatus, after having been backed up to the position before the signal recorded on the cueing track, is then started forward again. The apparatus operates, as has been previously described, to measure two-and-two-thirds seconds from the time the mark is set. The counter 152 thereafter measures two-tenths of a second, at which time an output is applied from the counter 152 over the selector switch 158 to open the gate 124. The output of the gate 124 is applied to a divide-by-2 counter 160, which is reset initially to a state at which it will immediately provide an output in response to the first-pulse signal received from the gate 124. This output is applied to a four-stage ring counter 162 having structure similar to that of the other four-stage ring counters in the timer. The respective counter outputs are designated as M, N, O, P, and these are respectively connected to the M, N, O, P terminals of the sampling-rate switch.

Since the divide-by-2 counter 160 will apply a pulse to the counter 162 for every two pulses received, each output of the counter 162 exists for one-thirtieth of a second. The counter 162 will therefore successively enable the storage-tube apparati 12, 14, 16 and 18 to freeze and display the video signals recorded over one-thirtieth-of-a-second intervals, which occur commencing with $2+\frac{2}{3}+\frac{2}{10}$ seconds or 2 and $\frac{13}{15}$ seconds after the 400-cycle signal on a cueing track.

The editor can then make his selection. He now has had displayed for him every picture which is recorded within the tenth of a second on the Videotape. The selection can be effectuated, as previously indicated, by operating the S1 switch to its mark, or fourth, contact position and the SM switch to the contact position associated with the storage-tube apparatus displaying the selected picture. Assuming that the third picture being displayed is the one at which it is desired to cut the tape, then the SM switch is actuated to select the third contact which is connected to the output of pulse amplifier 86. Of course, the S1 switch is actuated to its fourth contact position. The Videotape is then backed to the position before the 400-cycle signal on the cueing track. Videotape is then started running forward. The 400-cycle signal will be recognized and detected as previously described. All the counters will operate in the manner previously described to time an interval from the occurrence of the 400-cycle mark up until the one which has been selected by the setting of the selector switches 138, 146, and 158. Upon the occurrence of the timing signal at the output of the counter 152, which has effectively been selected by the SM switch position, the output of the pulse amplifier 86 is applied through the SM switch to the selector S1*d*, which is now on the fourth contact position. This enables the one-shot multivibrator 62 to apply an enabling pulse to the gate 34.

It should be noted that when the S1 switch is on its fourth contact position, a new pair of capacitors 35, 37 are connected into the frequency-determining circuits of the multivibrator 32, and it is caused to oscillate at a 1000-cycle frequency instead of the 400-cycle frequency. Thus, the gate 34 can now pass a 1000-cycle signal from the multivibrator 32 through the cathode follower 36 and resistor 38 to the cueing-recording apparatus in the Videotape machine 10.

It should be noted at this time that the cueing-control circuit, which is included in the relay contacts 44, has been previously operated to cause the cueing apparatus to be in the record mode. This occurs when the 400-cycle signal is recognized and detected. The one-shot multivibrator 110, in response to the 400-cycle signal, applies its output to a cathode follower 114. This cathode follower is connected over the S1*e* selector arm and contact 4 to a relay-drive amplifier 115. This amplifier is connected to the solenoid of the relay 40. This solenoid is excited in response to the pulse received and operates the single-pole, double-throw contacts 42, 44 to their lowermost position. At this position, the contacts 42 serve as latching contacts and hold the relay solenoid operated over a circuit which can be traced from B+, through the solenoid coil, through the fourth contact associated with selector-arm S1*g*, through the swinger arm and contact of the contacts 42, through a resistor 164, to ground. It will be readily appreciated that contact 44 now makes a closed circuit with the cueing-control circuits, whereby these are now in their record mode. Accordingly, the 1000-cycle signal, which has a duration of $\frac{1}{120}$ second, is recorded on the cueing track of the Videotape to mark the location of the commencement of the frame at which editing is desired.

By subsequently rendering the recorded signal audible, using the techniques previously described herein, the location at which the tape may be cut is exactly designated.

It will be appreciated that editing can occur at any time in the manner described that the editor sees a picture on the storage-tube apparatus which he desires to edit. He need not operate the apparatus down to the last one-thirtieth of a second. The detailed circuit diagrams of the various gates, multivibrators, counters, amplifiers, and cathode followers are not provided, in view of the fact that all these are circuits well known in the electronic art and can be commercially purchased from a number of different suppliers. Thus these need not be described. It should be understood, however, that the circuitry exemplified by the rectangles herein may be fabricated, employing either vacuum tubes or transistors, without departing from the spirit and scope of this invention. The cathode-follower circuits, for example, may readily be replaced by the transistor dual which is an emitter-follower circuit.

In FIGURE 2 it will be noted that there is a "start mark" position assigned to the selector switch arm S1*a* and S1*b*. This is the first contact position. Its function is to permit marking the tape manually with a 1000-cycle signal when a picture is displayed on a video monitor and it is not desired to use the timing-circuits operation. This occurs when an extremely accurate positioning of the 1000-cycle signal is not necessary. All that is required for this operation is to set selector arms S1*a* and S1*b* to the first contact position, start the Videotape running forward, and, when a picture is seen at which it is desired to mark the tape, momentary switch 30 is actuated. This opens gate 46, sets flip-flop 58, which in turn actuates one-shot multivibrator 62. This opens gate 34 for $\frac{1}{120}$ of a second, whereby a 1000-cycle signal having that duration is passed through for recording. Flip-flop 58 will be reset when counter 130 fills subsequently, whereby the reset pulse is initiated.

It may be desirable to make a permanent record of the television pictures in the vicinity of the tape in which editing will occur. This may either be done by photographing the pictures displayed on the storage tubes, or by photographing the pictures being displayed on the monitor 24, shown in FIGURE 1, while the tape is being run. It may be desirable to save the cost of the storage-tube apparatus by replacing these with one camera capable of recording television pictures from the face of the monitor tube. Such cameras are known and are described in patents such as Patents Numbers 2,716,154 and 2,783,300 to Paul Raibourn, or in Patents Numbers 2,486,717 and 2,859,275 to Carl D. Maurer.

Figure 4:
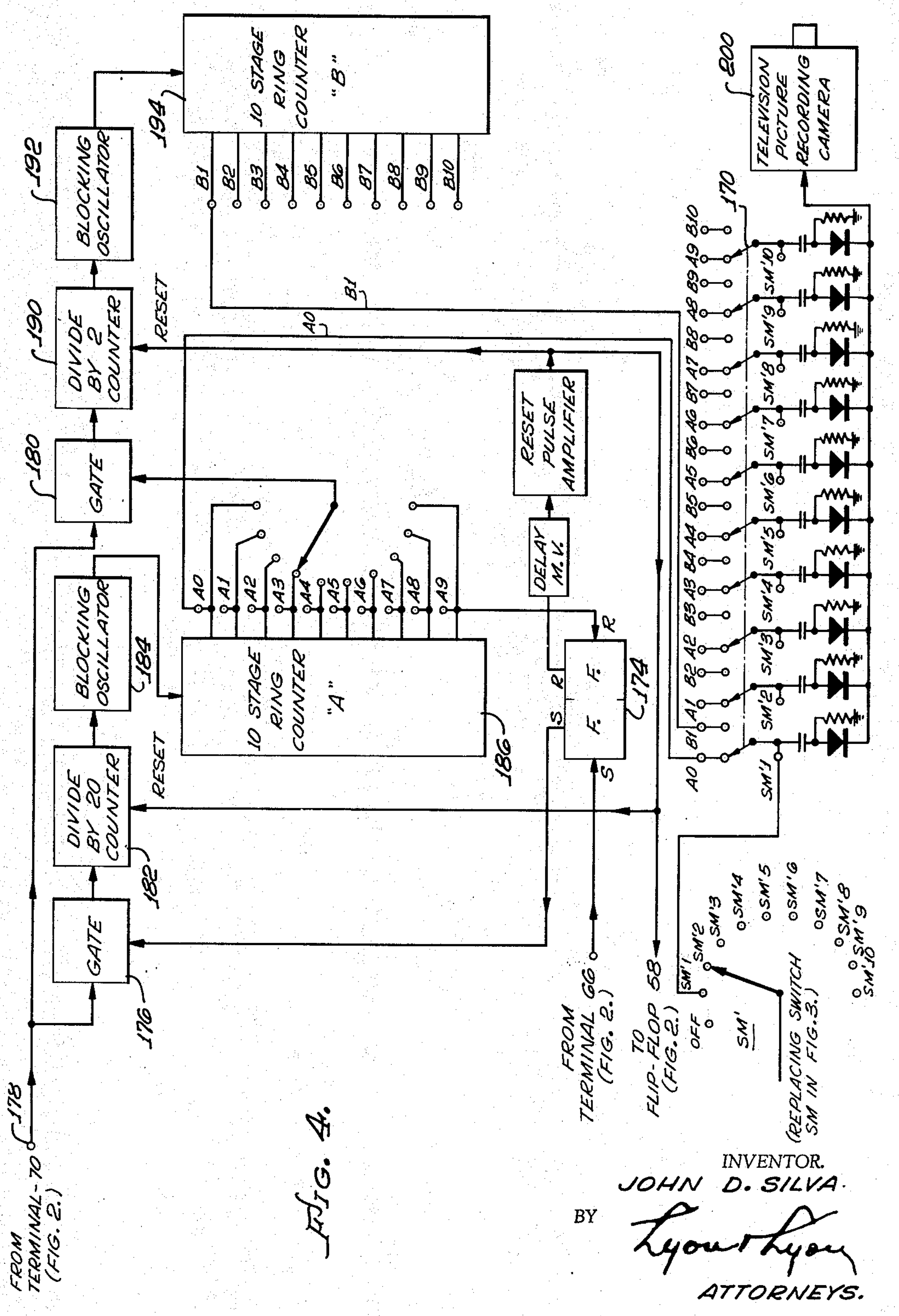
FIGURE 4 is a block diagram of a timer circuit which may be employed with an embodiment of the invention which employs cameras.

In order to accommodate a motion-picture camera, it is necessary to arrange for timing signals which can be applied to a camera for the purpose of controlling it to take pictures at the proper intervals. An arrangement for providing the required timing pulses is shown in FIGURE 4. The structure shown in FIGURE 2 remains the same and provides the 60-cycle pulses from terminal 70 and the start pulse from terminal 66. This sole change in the arrangement shown in FIGURE 2 is to replace the selector switch designated as SM with a selector switch designated as SM′, shown in FIGURE 4. The selector switch designated as SM has five contact terminals. The selector switch designated as SM′ has eleven contact terminals, the first of which is an off terminal, and the remaining terminals, respectively numbered from 1 through 10 (shown in FIGURE 4) are connected to the multiposition switch 170, to the terminals similarly identified thereon.

A clock pulse from terminal 66 in FIGURE 2 is applied to terminal 172 in FIGURE 4. This causes the flip-flop 174, which is connected to this terminal, to be driven to its set state. As a result, a gate 176 is enabled to pass clock pulses which are received from terminals 70 in FIGURE 3 by way of an input terminal 178. These clock pulses are also applied to a gate 180. The clock pulses which occur at a 60-cycle-per-second rate are divided by 20 by a divide-by-twenty counter 182, which is connected to the output of the gate 176. As a result, one pulse is emitted by the divide-by-twenty counter at every one-third of a second. The output of the divide-by-twenty counter 182 is applied to a blocking oscillator 184. This properly shapes the output into pulses, so that a ten-stage ring counter 186 can be driven thereby.

The output of the ten-stage ring counter 186, consisting of ten pulses occurring at the rate of three per second, will span a three-second interval. The respective outputs of counter 186 are connected to a selector switch 188, having ten contacts—and thus the capability of selecting any one of the ten outputs—and are also connected to the terminals, respectively designated from A0 to A9 on the multiposition selector switch 170.

The gate 180 is also receiving the clock pulses. However, it does not pass any of these until the gate also receives an output from the ten-stage ring counter. Thus, selector switch 188 can select any one-third of one-second interval over three seconds, during which time the gate 180 will be maintained open and will pass the 60-cycle-per-second clock pulses. In the position shown in FIGURE 4, the interval selected is that interval commencing with the beginning of the first second and ending one-third of a second thereafter. The output of the gate 180 is applied to a divide-by-two counter 190. The output of the divide-by-two counter 190 is applied to a blocking oscillator 192. The blocking oscillator applies thirty pulses per second over a one-third of a second interval to a ten-stage ring counter 194. The outputs from the ten-stage ring counter 194 are applied to the respective terminals on the multiposition selector switch 170, which are designated from B1 through B10.

At the end of the count of the ten-stage ring counter 186, its output, which marks the interval from the two and two-thirds seconds to three seconds, drives the flip-flop 174 to its reset condition. This results in the gate 176 now being closed and a delay multivibrator 196 being actuated by the output of the flip-flop. Delay multivibrator 196 applies a pulse after a one-third of a second delay to a reset pulse amplifier 198. The reset pulse amplifier output resets the divide-by-two counter 190 to an initial state, as well as the divide-by-twenty counter 182 to an initial state. No output is derived from the divide-by-twenty counter or divide-by-two counter when they are reset to their initial states. The output of the reset-pulse amplifier also provides a reset pulse to flip-flop 58, shown in FIGURE 3.

The arrangement just described makes available at the selector switch 170 output pulses which occur at the rate of three per second over three seconds, as well as ten output pulses within any one of the one-third of a second intervals over the three seconds covered by the operation of the ten-stage ring counter 186. There are ten movable arms in selector switch 170, all of which can be actuated from a position connecting to one of the ten outputs of the ten-stage ring counter 186 to a second positino connecting to the ten outputs of the ten-stage ring counter 194. The selecting arms are ganged to be movable simultaneously. Thus, the selector switch SM′ has all but the first of the ten outputs from the selector switch 170, whereby, when it is desired to mark the Videotape for editing, a pulse for energizing the marking equipment shown in FIGURE 3 is selected which will occur at any one-thirtieth of a second interval within the three-second interval which has been initially selected for viewing for the purpose of editing.

To use this equipment initially, a 400-cycle marking signal is applied to the Videotape in the manner originally described. This indicates the beginning of the three-second section of Videotape which can be recorded for editing. The Videotape is then backed up and started forward again. Upon recognition of the 400-cycle signal, a start pulse is applied to flip-flop 174 in FIGURE 4, and clock pulses which have been continuously applied to the two gates 176, 180 are enabled to be passed through the gate 176 to the ten-stage ring counter 186. The selector switch 170 is preset in its position wherein it selects the output from the ring counter 186. All the outputs of the selector switch 170 are connected together to be applied in succession to the television picture-recording camera 200. As a result of receiving these ten pulses, the television picture-recording camera 200 will make ten pictures, each of which represents a frame which occurs over the ten one-third of a second intervals at the commencement at each one-third of a second. The film can then be developed and printed. If the tape editor decides to edit the tape at any one of the ten pictures displayed before him, then he can select the one of the ten positions afforded by the switch SM′ which is associated with the one of the ten pictures. The Videotape is backed up and then run forward again. A pulse will be obtained by the switch SM′, which will operate the circuitry shown in FIGURE 2 in the manner previously described to apply a one-thousand cycle signal to the Videotape at the location thereon wherein is recorded the signals corresponding to the picture selected by the editor.

If the editor wishes to view the pictures occurring within any one-second interval which is selected on the basis of the ten pictures already taken, then he can position the selector switch 188 to the one of the output terminals of the ten-stage counter 186 which corresponds to the beginning of that one-third second interval. The selector switch 170 is then moved to its second selecting position wherein it connects to the respective terminals B1 through B10, which are the outputs from the ten-stage ring counter 194. The Videotape is backed up once more before the location at which the 400-cycle note was recorded. It is then started forward once again. This time when the ten-stage ring counter 186 reaches the counter which has been selected by the selector switch 188, the gate 180 is opened and as a result the ten-stage ring counter 194 will be driven over the one-third of a second interval selected by ten pulses.

In response to the output of the ring counter 194, the camera 200 will record ten pictures within the one-third of a second interval which has been selected. The editor can then inspect these pictures. If he finds one therein which indicates a suitable location for editing, he can select by means of switch SM′ the position which will extract a pulse for properly actuating the circuitry shown in FIGURE 2. The Videotape is then backed up and run forward once again. A single output pulse from the ten-stage ring counter 194 which has been selected by means of the selector switches 170 and SM′ will then actuate the marker-generator circuitry shown in FIGURE 2 to apply a one-thousand cycle marking signal to the Videotape machine in the manner previously described.

Accordingly, there has been described and shown herein novel and useful apparatus for enabling the editing of Videotape wherein the editor can see the pictures on the tape while the tape is being run forward, can record these pictures if he so desires, and can mark on the tape the exact location of the individual picture at which splicing is desired. The arrangements for obtaining the signals shown in FIGURE 3, wherein a group of storage tubes are employed, or in FIGURE 4, wherein a recording camera is employed, may both be combined in the same machine with switches being provided for selecting the one or the other arrangement, as desired.

I claim:

1. A system for inspecting for editing Videotape of the type having recorded thereon composite video signals including vertical-synchronizing signals and having a cueing track for recording marking signals associated with said composite video signals, said system comprising means for reading said video signals from said tape, means for generating a first marking signal, means for recording signals on said cueing track, means for applying said first marking signal to said means for recording at a location on said cueing track identifying the beginning of Videotape having video signals desired to be inspected for editing means, for reading signals recorded on said cueing track, means responsive to said first marking signal being read for generating successive timing signals each having a predetermined duration at selective time intervals occurring thereafter, means rendered operative in response to a timing signal for affording a continuous display of a picture represented by video signals applied to said means at the time of the application of one of said timing signals thereto, means for applying the video signals read from said Videotape to said means for affording the continuous display of a picture, means for selectively applying said successive timing signals to said means for affording a continuous display of a picture to render it operative to respond to said means for applying video signals, means for generating a second marking signal, means for selecting the next timing signal which will be generated at the same interval after the reading of said first marking signal as the timing signal responsive to which a desired picture is obtained from said means for affording a continuous display of pictures, and means for applying said second marking signal to said means for recording signals on said cueing track responsive to the occurrence of said selected next timing signal for marking the location on said Videotape for editing.

2. A system for inspecting for editing Videotape as recited in claim 1 wherein said means rendered operative in response to a timing signal for affording a continuous display of a picture represented by video signals applied to said means at the time of the application of one of said timing signals comprises a camera for recording pictures from a television monitor tube in response to signals; and said means for applying the video signals read from said Videotape includes a television monitor tube, and means for applying the video signals read from said Videotape to said television monitor tube to be displayed as a picture, said camera being positioned for taking pictures of the pictures displayed by said monitor tube.

3. A system as recited in claim 2 wherein said means for generating successive timing signals each having a predetermined duration at selective time intervals includes a first counter and a second counter, means for applying said vertical-synchronizing signals to said first counter to be counted including a closed gate means to which said vertical sync signals are applied, means for rendering said closed gate means operative open to pass vertical synchronizing signals responsive to detection of said first marker signal, means for applying output from said first counter each time it attains a full count to said second counter to be counted, means for deriving said timing signals from the count outputs of said second counter, means responsive to said second counter attaining a full count for closing said gate means and for resetting said first counter to its next-to-filled count condition.

4. A system as recited in claim 2 wherein said means for generating successive timing signals each having a predetermined duration at selective time intervals includes first, second, third, and fourth counters said first and second counters each having a different count capacity, said third and fourth counters having the same count capacity, a first and a second closed gate means, means for connecting the output of said first closed gate means to said first counter input, means for applying the full count output of said first counter to said third counter, means for connecting the output of said second closed gate means to said second counter input, means for applying the full count output of said second counter to said fourth counter input, first selector-switch means for applying a selected one of the count outputs of said third counter to said second closed gate means input, means for applying said vertical-synchronizing pulses to said first and second closed gate means to open said second gate means to the passage of the selected count outputs, means for applying said first marker signal to said first closed gate means to open it to pass vertical synchronizing pulses whereby said first counter advances to its count in response to said vertical-synchronizing pulses, said second counter advances its count each time said first counter fills, said third counter advances its count in response to said vertical-synchronizing pulses over an interval established by the count selected by said first selector-switch means, and said fourth counter advances its count each time said second counter fills, switch means for deriving said timing signals from the count outputs of said third and fourth counter, and means responsive to said third counter attaining a full count for rendering said first gate means closed and for resetting said first and second counters to their initial positions.

5. A system for inspecting for editing Videotapes as recited in claim 1 wherein said means rendered operative in response to a timing signal for affording a continuous display of a picture represented by video signals applied to said means at the time of the application of one of said timing signals includes a plurality of inoperative video monitor storage means for continuously displaying a picture.

6. A system for inspecting for editing Videotape of the type having recorded thereon composite video signals including vertical-synchronizing signals and having a cueing track for recording marking signals associated with said composite video signals, said Videotape being carried in a machine having means for reading said composite signals from said Videotape, means for recording signals on said cueing track, and means for reading signals recorded on said cueing track, said system for inspecting comprising means for generating a first marking signal, means for applying said first marking signal to said means for recording at a location on said cueing track identifying the beginning of a region desired to inspect for editing, means responsive to said first marking signal being read by said means for reading signals recorded on said cueing track for generating successive timing signals each having a predetermined duration at selective time intervals occurring thereafter, a plurality of video-monitor storage means rendered operative in response to a timing signal for continuously displaying a picture represented by video signals applied thereto, means for applying the video signals read from said Videotape to said plurality of video-monitor storage means, means for selectively applying a different one of said successively generated timing signals to each of said plurality of video-monitor storage means for enabling each of them to continuously display a picture representative of the composite video signals received during the application of one of said timing signals, means for generating a second marking signal, means for selecting the next timing signal which will be generated at the same interval after the reading of said first marking signal as the timing signal responsive to which a desired picture was displayed by said video monitor storage means, and means for applying said second marking signal to said means for recording signals on said cueing track responsive to the occurrence of said selected next timing signal for marking the location on said Videotape for editing.

7. A system as recited in claim 6 wherein said means for generating successive timing signals each having a predetermined duration at selective time intervals includes a first counter and a second counter, means for applying said vertical-synchronizing signals to said first counter to be counted including closed gate means to which said vertical synchronizing signals are applied, means for rendering said gate means open responsive to detection of said first marker signal to apply said vertical sync signals to said first counter, means for applying output from said first counter each time it attains a full count to said second counter to be counted, means for deriving said timing signals from the count outputs of said second counter, means responsive to said second counter attaining a full count for rendering said gate means closed and for resetting said first counter to its next-to-filled count condition.

8. A system as recited in claim 6 wherein said means for generating successive timing signals each having a predetermined time duration at selective time intervals includes a plurality of first and second counters, a plurality of closed gate means, means for applying said vertical-synchronizing signals to said plurality of closed gate means, means for applying output from a different one of said gate means when open to a different one of said first counters to be counted, each of said first counters providing an output when filled, each of said first counters having a different count capacity to provide an output at different desired intervals, means for applying output from a different one of said first counters to a different one of said second counters to be counted, each of said counters providing an output at each count state, switch means for selecting a desired one of each of said second counter outputs except the full count output and applying it to a different one of said gates for opening said gate, means for opening a first of said plurality of closed gate means responsive to detection of said first market signal, means for deriving said timing signals from the count outputs of a desired one of said second counters, and means responsive to the one of said first counters having the largest count capacity to reset all said first counters to their next-to-filled count conditions and to render the first one of said gates means closed.

9. A system for inspecting for editing Videotape of the type having recorded thereon composite video signals including vertical-synchronizing signals and having a cueing track for recording marking signals associated with said composite video signals, said Videotape being carried in a machine having means for reading said composite signals from said Videotape, means for recording signals on said cueing track, and means for reading signals recorded on said cueing track, said system for inpsecting comprising means for generating a first marking signal, means for applying said first marking signal to said means for recording at a location on said cueing track identifying the beginning of a region desired to inspect for editing, means responsive to said first marking signal being read by said means for reading signals recorded on said cueing track for generating successive timing signals each having a predetermined duration at selective time intervals occurring thereafter, said last-named means including means responsive to said vertical synchronizing signals for generating in sequence evenly spaced first timing signals over a first interval, a means for selecting a desired one of said first timing signals, and means responsive to the application of vertical-synchronizing signals and of a first timing signal by said means for selecting for generating in sequence evenly spaced second timing signals over said selected first interval, a plurality of video-monitor storage means, the number in said plurality being equal to the number of first timing signals, each of said plurality of video monitor storage means including means rendered operative in response to a timing signal to display a picture represented by video signals being applied thereto at the time means for applying the video signals read from said Videotape to said plurality of video-monitor storage means, means for selectively applying a different one of said first timing signals to a different one of said video-monitor storage means or a different one of said second timing signals to a different one of said video-monitor storage means for rendering them operative to continuously display pictures representative of the composite video signals received during the application of timing signals, means for generating a second marking signal, means for selecting the next one of said first and second timing signals which will be generated after the reading of said first marking signal and responsive to which a desired picture was displayed by said video-monitor storage means, and means for applying said second marking signal to said means for recording signals on said cueing track responsive to the occurrence of said selected next timing signal for marking the location on said Videotape for editing.

10. A system as recited in claim 9 wherein said means for generating successive timing signals includes counter means for generating first, second, third, and fourth timing signals, said first timing signals occurring each second, said second timing signals occurring each one-third second, said third timing signals occurring each one-tenth second, said fourth timing signals occurring each one-thirtieth second.

References Cited in the file of this patent

UNITED STATES PATENTS 2,912,493 Crooks ________________ Nov. 10, 1959

OTHER REFERENCES

"Magnetic Video Tape Editing Apparatus," J. A. Zenel, R.C.A. Technical Note; TN 20.